Figure 9:
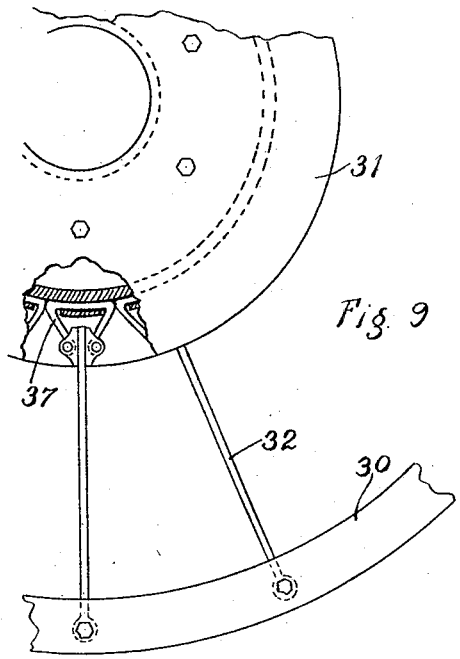

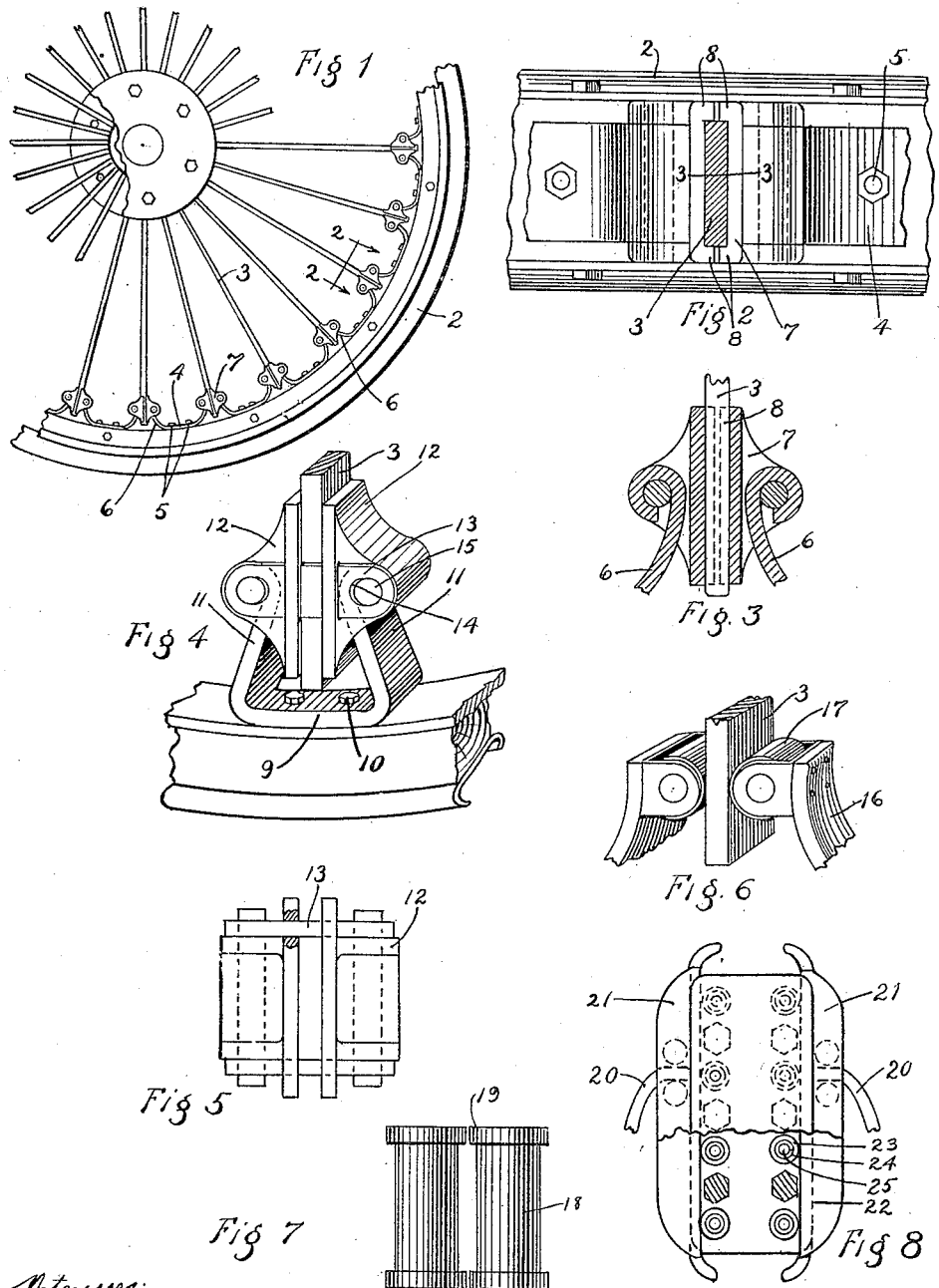

W. B. GRAY.
RESILIENT WHEEL.
APPLICATION FILED JAN. 30, 1913.

1,133,467.

Patented Mar. 30, 1915.
2 SHEETS—SHEET 2.

UNITED STATES PATENT OFFICE.

WILLIAM B. GRAY, OF CHICAGO, ILLINOIS.

RESILIENT WHEEL.

1,133,467.      Specification of Letters Patent.      Patented Mar. 30, 1915.

Application filed January 30, 1913. Serial No. 745,100.

*To all whom it may concern:*

Be it known that I, WILLIAM B. GRAY, a citizen of the United States, residing at Chicago, county of Cook, State of Illinois, have invented a certain new and useful Improvement in Resilient Wheels, and declare the following to be a full, clear, and exact description of the same, such as will enable others skilled in the art to which it pertains to make and use the same, reference being had to the accompanying drawings, which form a part of this specification.

Many attempts have been made to produce resilient wheels by connecting the hubs with the rims through spring spokes or other resilient devices. It has been attempted to make spokes in part of straight flat springs so connected to the rim and hub members as to permit relative radial movement with respect to at least one of such members. Although straight flat springs are cheap and simple and can be reproduced with great uniformity so as to make them highly satisfactory elements of resilient wheels, the difficulties which have been encountered in satisfactorily connecting such springs between a hub and a rim have heretofore made the use of straight flat spring spokes commercially impracticable.

The object of my invention is to produce a simple and novel construction and arrangement of parts which shall make it practicable to produce a strong, durable and effectively cushioned wheel with spokes having the form of straight flat springs.

Two of the principal problems encountered in the construction of a satisfactory wheel having straight spring spokes are the utilization of the entire radial distance between the hub and the rim for spring purposes or, in other words, to make it possible to use a spring of maximum length; and furthermore, to provide means for preventing wear between the spokes and the parts with which they slidably engage or, if any wear occurs, for automatically taking up such wear so as to make the wheel run silently. In addition to these problems there is of course also that of cost, both initial cost and cost of making repairs and replacements.

Specifically considered, my invention may be said to have for its object to produce a novel construction and arrangement of parts which will give a maximum effective spring length to the spokes, reduce the amount of wear and automatically take up such wear as may occur, and reduce the initial cost and the cost of repairs and replacements to a minimum.

Figure 10:
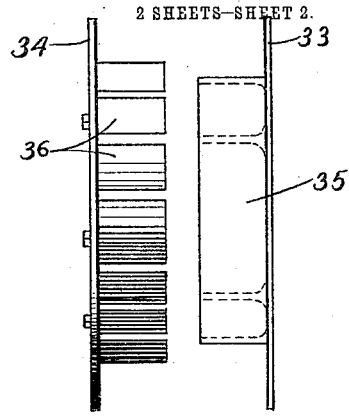
Figures 11, 12:
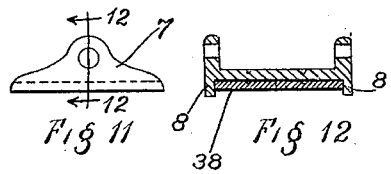

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a fragment of a wheel arranged in accordance with one form of my invention; Fig. 2 is a section on an enlarged scale on line 2—2 of Fig. 1; Fig. 3 is a section on line 3—3 of Fig. 2; Fig. 4 is a perspective view on a larger scale than Fig. 1 of a fragment of a wheel rim and the adjacent end of a spoke; Fig. 5 is a view looking down on Fig. 4, the spoke and rim being omitted; Fig. 6 is a perspective view of a fragment of a holding and bearing device containing rollers for engaging with the spoke; Fig. 7 is a plan view of two rollers such as illustrated in Fig. 6, provided with end flanges to take the side thrust on the spokes; Fig. 8 is a view similar to Fig. 4 showing a modified arrangement in which the spoke is engaged with rollers mounted in a movable cage; Fig. 9 is a view partly in side elevation and partly in section of a fragment of a wheel wherein the spokes are attached to the rim and a sliding connection is provided between the spokes and the hub; Fig. 10 is a side view of the two halves of the hub shown in Fig. 9, separated from each other; Fig. 11 is a side view on an enlarged scale of one of the shoes carried by the hub in Fig. 9 and engaging at the spokes; and Fig. 12 is a section on line 12—12 of Fig. 11.

Referring to Figs. 1 and 2 of the drawings, 1 represents a wheel hub and 2 a wheel rim. 3 are spokes in the form of long straight flat springs rigidly connected in any suitable way to the hub and extending from the latter to the rim. Distributed around the interior of the rim, between the outer ends of the spokes, is a series of spring plates, 4, each secured to the rim in any suitable way, as indicated at 5 between two of the spokes. The ends of the spring plates are bent inwardly toward the center of the wheel, preferably along gradual curves and the free ends of each plate are made to extend in proximity to the adjacent ends of the two adjacent plates in the series. In this way spring bearing guides are provided for the outer ends of the spokes, each spoke passing between and being yieldably held by two of the bent ends or arms. The spokes are made slightly shorter than the radial distance between the hub and the rim so that they may move bodily in the radial direction without coming in contact with the rim. Thus when the parts of a wheel are assembled, the wheel consists of a hub, a rim, and spring spokes extending between the hub and rim but connected to the rim only by having their ends slidably engaged between spring pressed arms or parts and having no direct contact with the rim. When the wheel is put in operation, under a superposed load, all of the spring spokes except one or two which happen to be perpendicular at any given instant, are flexed more or less, those in the upper half of the wheel having their outer ends drawn between the holding and bearing devices toward the center of the wheel while those in the lower half of the wheel have their outer ends move toward the rim; the movement in either case being insufficient to disconnect the spokes from the holding and bearing devices or bring the outer ends into engagement with the rim, so that the hub is always hung from the rim on a yielding cushion made up of a large number of long flat springs. By making the holding and bearing devices of spring metal, they will yield to adapt themselves to the curvature of the spokes as the latter are flexed and will automatically take up any wear which occurs on the engaging surfaces between the spokes and the holding and bearing devices, so that there will never be any looseness or rattling which would be incident to lost motion between the wearing faces on the spokes and holding devices. The bent ends or arms, 6, of the spring plates may be provided with shoes, 7, which serve as the direct engaging means with the spokes. Furthermore, if desired, the shoes may have flanges, 8, at the sides, these flanges extending toward each other so as to form between each pair of shoes a pocket the walls of which will engage not only with the flat faces of the spokes but also with the side edges and thus prevent slippage in the sidewise direction.

In Figs. 4 and 5 I have shown a somewhat different arrangement, each spring plate 9 lying between the outer end of one of the spokes and the rim and being attached to the rim by suitable fastening devices 10. The ends of the plates 9 are bent inwardly so as to form on each plate two spring arms 11 lying on opposite sides of and coöperating with one of the spokes. In this arrangement, also, the spring arms may be provided with shoes as indicated at 12, for engagement with the spokes. Displacement of the spokes in the lateral direction, and undue separation of the arms coöperating with each spoke may conveniently be prevented by connecting each pair of shoes together with links 13 having elongated slots or holes, 14, through which extend the pins, 15, by which the shoes are held on the springs.

In Fig. 6 I have shown an arrangement in which the spring arms, 16, of the type shown either in Fig. 1 or in Fig. 4, are provided with rollers, 17, instead of bearing directly against the spokes or having friction shoes which engage with the spokes. If desired, the rollers may be shaped as illustrated in Fig. 7, the rollers 18, there illustrated, having end flanges, 19, which are adapted to take the side thrust on the spokes.

If desired, the spring arms, either of the type shown in Fig. 1 or that shown in Fig. 4 may be provided at their ends with bearings of the type shown in Fig. 8; the spring arms 20 carrying shoes 21 between which is loosely held a roller cage, 22. The rollers 23 have axle openings, 24, which are larger in diameter than the pins or axles 25 which hold them in place. This permits the rollers on opposite sides of the socket to move from and toward each other. The spoke is adapted to lie between and engage with the two sets of rollers, while the shoes 21 bear against the outer sides of the rollers and yieldingly press them into engagement with the spoke. If desired, the spokes may be fastened to the rim and have sliding engagement with suitable holding and bearing devices arranged at the hub, one such arrangement being indicated in Figs. 9 and 10. Referring to these figures, 30 represents a rim and 31 a hub, while the flat spring spokes are represented at 32. The hub may conveniently be made of two separate plates 33 and 34; the plate 33 having on one side a drum 35; and the other plate having on one side a divided drum, 36, larger in diameter than the drum 35. The number of divisions of the drum 36 is equal to the number of spokes in the wheel. Upon the drum 35 rest a series of holding devices, 37, of the general type illustrated in Fig. 4, one section of the drum 36 overlying the yoke portion of each of these holding devices so that, when the two parts of the hub are clamped together, each holding device is held between the two drums against radial movement and is also held by one of the sections of the drum 36 against circumferential movement.

In Figs. 11 and 12 I have illustrated one of the shoes adapted to be used either with the holding devices shown in Figs. 1 and 4 or with a holding device arranged at the hub as indicated in Fig. 9. The wearing face of each shoe may consist of a plate, 38, of bronze or other suitable material detachably connected to the shoe so as to provide means for removing a worn wearing plate and replacing it by a new one.

It will now be seen that I have produced a cheap, simple and efficient arrangement of parts which permits a wheel to be made with long spring spokes extending the entire radial distance from the hub to the rim, excepting the small clearance required at one end of each spoke when the sockets are arranged on the inner side of the rim; which enables the spokes to bend along natural curves when the wheel is in operation; and which automatically takes up wear and prevents lost motion and noise.

I claim:

1. In combination, a hub member, a rim member, spokes in the form of springs extending between the said members and fastened to one of said members and free at the other end, and spring plates each fixed at the center to the other of said members and having its ends bent into arms extending approximately radially toward the hub, each spoke being engaged and yieldingly clamped between two of said arms arranged on opposite sides thereof.

2. In combination, a hub member, a rim member, spokes in the form of springs extending between said members, said spokes being fastened at one end to one of said members and having the other end free, and spring plates each fixed at the center to the other of said members and having its ends bent into arms overlapping the free ends of adjacent spokes, the plates corresponding in number to the spokes, and the arms of the plates being bent so that each lies at an angle to one of the spokes and yieldably engages therewith.

3. In combination, a hub member, a rim member, a series of sockets carried by one of said members, spokes in the form of springs secured to the other of said members and each slidably engaged at its other end with one of said sockets, each of said sockets comprising two spring arms lying at an angle to each other and tending normally to approach each other at their free ends more closely than the thickness of one of the spokes.

4. In combination, a hub member, a rim member, spokes in the form of springs extending radially between said members and secured to one of them, spring sockets secured to the other member and embracing the free ends of the spokes, said sockets being provided with rolling anti-friction members engaging with the spokes and movable bodily in the direction of the length of the spokes.

In testimony whereof I sign this specification in the presence of two witnesses.

WILLIAM B. GRAY.

Witnesses:
WM. F. FREUDENREICH,
RUTH E. ZETTEWALL.

Copies of this patent may be obtained for five cents each, by addressing the "Commissioner of Patents, Washington, D. C."